(12) United States Patent
Cross

(10) Patent No.: US 12,228,190 B1
(45) Date of Patent: Feb. 18, 2025

(54) SEQUENTIAL PROPULSION DRIVE

(71) Applicant: Ryan Joseph Cross, Tempe, AZ (US)

(72) Inventor: Ryan Joseph Cross, Tempe, AZ (US)

( * ) Notice: Subject to any disclaimer, the term of this patent is extended or adjusted under 35 U.S.C. 154(b) by 0 days.

(21) Appl. No.: 18/370,856

(22) Filed: Sep. 20, 2023

Related U.S. Application Data

(60) Provisional application No. 63/408,681, filed on Sep. 21, 2022.

(51) Int. Cl.
| | |
|---|---|
| *F16H 1/22* | (2006.01) |
| *F16H 57/02* | (2012.01) |
| *F16H 57/021* | (2012.01) |

(52) U.S. Cl.
CPC ............ *F16H 1/22* (2013.01); *F16H 57/021* (2013.01); *F16H 2057/02034* (2013.01)

(58) Field of Classification Search
CPC . F16H 1/22; F16H 57/021; F16H 2057/02034
USPC .......................................................... 74/661
See application file for complete search history.

(56) References Cited

U.S. PATENT DOCUMENTS

| | | | | |
|---|---|---|---|---|
| 7,792,626 | B2 * | 9/2010 | Eriksson | F02D 25/02 477/6 |
| 8,337,359 | B2 * | 12/2012 | Hofbauer | B60W 10/08 477/6 |
| 2015/0040720 | A1 * | 2/2015 | Kitabatake | B60K 6/50 903/902 |
| 2015/0184721 | A1 * | 7/2015 | Jun | B60K 6/448 180/65.23 |

* cited by examiner

*Primary Examiner* — Ha Dinh Ho
(74) *Attorney, Agent, or Firm* — Plager Schack LLP; Mark H. Plager, Esq.; Michael J. O'Brien, Esq.

(57) ABSTRACT

A sequential propulsion drive assembly is configured to drive a mechanical system. The sequential propulsion drive assembly has a primary output shaft that extends through the motor housing through a forward bulkhead, a central bulkhead, and a rear bulkhead. A collet is joined to a bottom plate and configured to stabilize the primary output shaft. An upper primary shift gear is operatively coupled to the primary output shaft and an upper output gear. An upper electric motor is resting on the central bulkhead and further comprising an upper output shaft. An upper clutch is joined to the upper output gear with an upper clutch. A lower primary shift gear is operatively coupled to the primary output shaft and a lower output gear. A lower electric motor resting on the rear bulkhead and further comprising a lower output shaft.

4 Claims, 2 Drawing Sheets

SEQUENTIAL PROPULSION DRIVE

RELATED APPLICATION

This application claims priority to provisional patent application U.S. Ser. No. 63/408,681 filed on Sep. 21, 2022, the entire contents of which is herein incorporated by reference.

BACKGROUND

The embodiments herein relate generally to electric machines.

Prior to embodiments of the disclosed invention, a high-power electric motor market was restrained by high initial costs, decreased fault tolerance, and a lack of multi-point design efficiency as a result of only presenting a single power band. The use of premium brushless direct current (DC) motors increased the efficiency of applications by approximately 20% compared to standard motors, which saved energy. However, these premium versions cost at a disproportionate rate against scaled efficiency. Electric motors also had a single point of failure; therefore, they do not meet the requirements of redundant applications such as aerospace or automotive. Lastly, both standard and premium motors were optimized for a single power band; therefore, these motors could not adapt to changing circumstances which could cause a decrease in efficiency about the useful range of application scenarios for the motors.

SUMMARY

A sequential propulsion drive assembly is configured to drive a mechanical system. The sequential propulsion drive assembly has a primary output shaft that extends through the motor housing through a forward bulkhead, a central bulkhead, and a rear bulkhead. A collet is joined to a bottom plate and configured to stabilize the primary output shaft. An upper primary shaft gear is operatively coupled to the primary output shaft and an upper output gear. An upper electric motor is resting on the central bulkhead and further comprising an upper output shaft. An upper clutch is joined to the upper output gear with an upper clutch. A lower primary shaft gear is operatively coupled to the primary output shaft and a lower output gear. A lower electric motor resting on the rear bulkhead and further comprising a lower output shaft. A lower clutch is joined to the lower output gear with a lower clutch.

A microcontroller is electrically coupled to the upper clutch and the lower clutch and programmed with a loop of instructions to execute while the sequential propulsion drive assembly is operative. First, receiving an upper motor engagement instruction from a user. Then, engaging the upper motor to drive the upper output gear with the upper clutch. Next, receiving a lower motor engagement instruction from the user. After that, engaging the lower motor to drive the lower output gear with the lower clutch. Following that, iterating the loop of instructions. The upper motor and the lower motor turn the primary output shaft.

A forward mechanical coupler is fixed to the forward bulkhead and wherein the forward mechanical coupler further stabilizes the primary output shaft with a forward thrust bearing.

A rear mechanical coupler is fixed to the rear bulkhead and wherein the rear mechanical coupler further stabilizes the primary output shaft with a rear thrust bearing.

A central mechanical coupler is fixed to the central bulkhead and wherein the central mechanical coupler further stabilizes the primary output shaft with a central thrust bearing.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
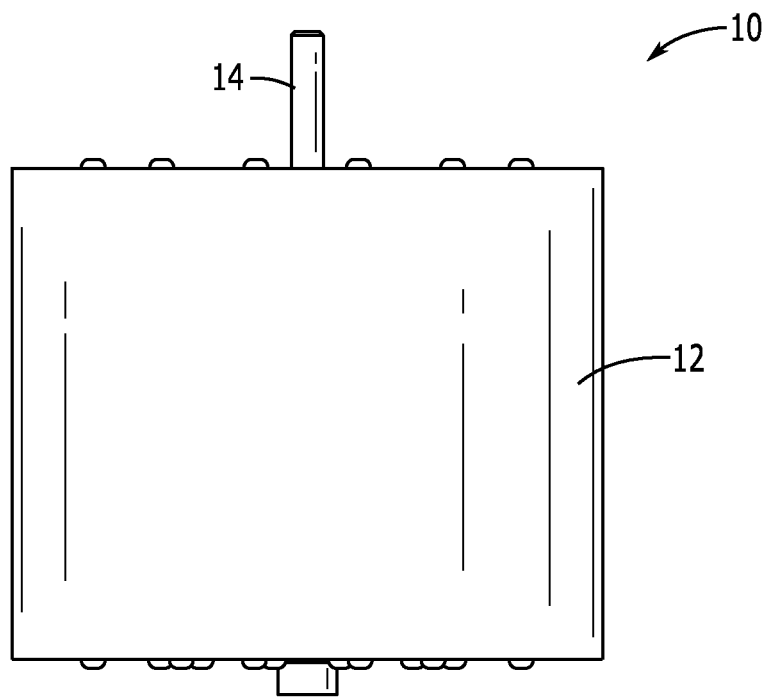
FIG. 1 shows a side elevation view of one embodiment of the present invention.
Figure 2:
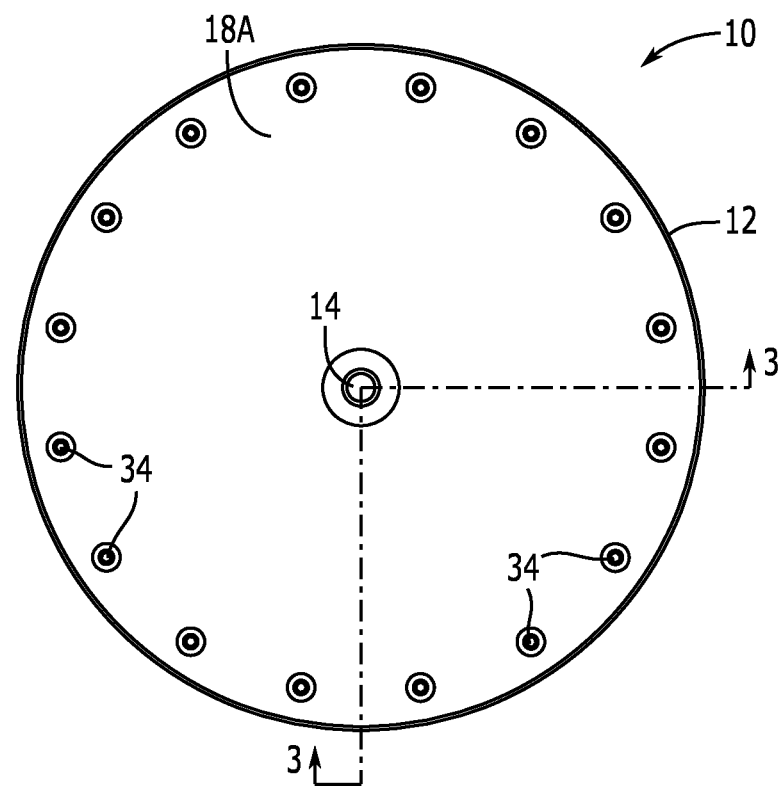
FIG. 2 shows a top plan elevation view of one embodiment of the present invention.
Figure 3:
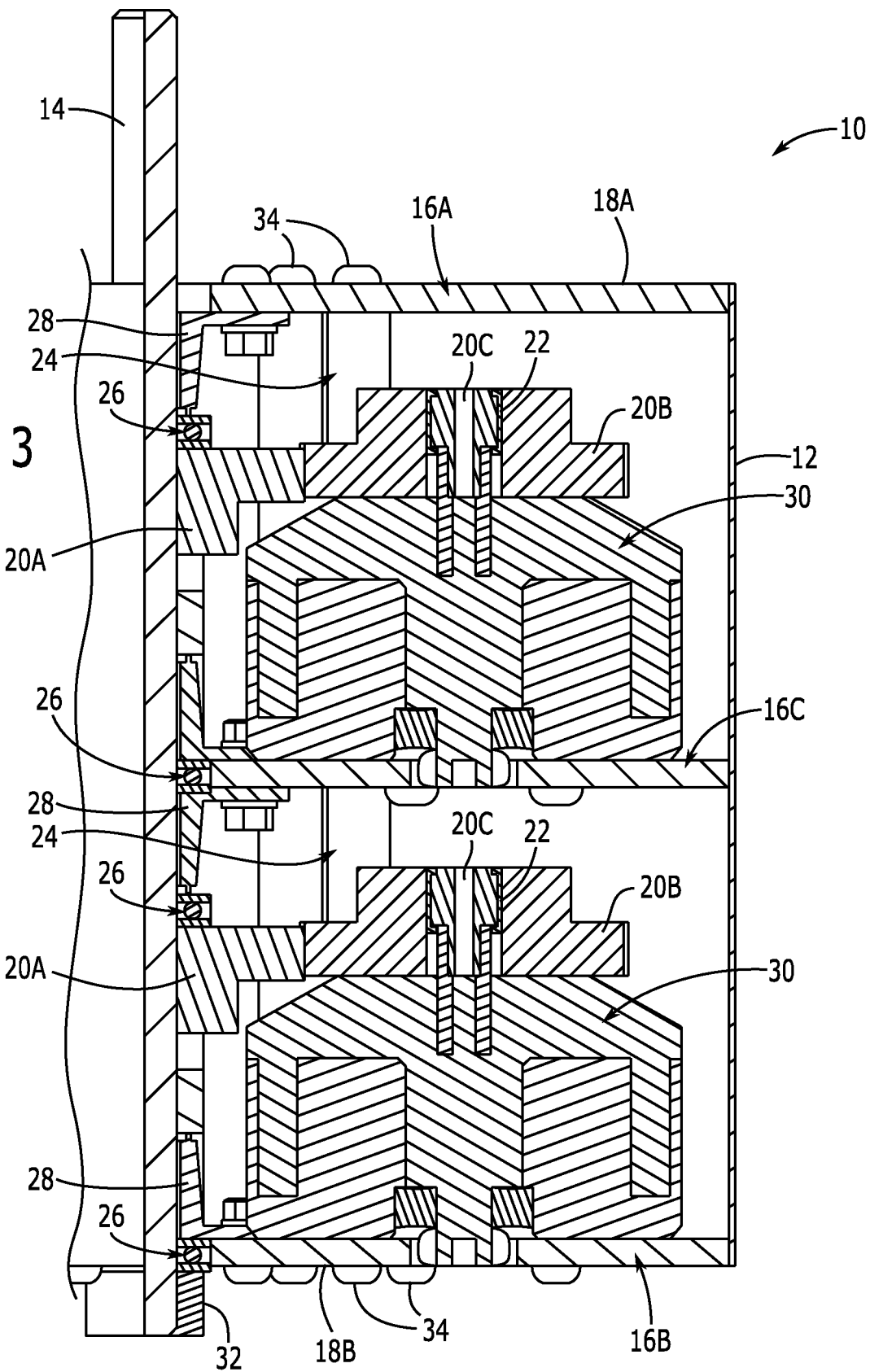
FIG. 3 shows a cross-section view of one embodiment of the present invention taken along line 3-3 in FIG. 2.

By way of example, and referring to FIGS. 1-3, one embodiment of a sequential propulsion drive assembly 10 comprises a motor housing 12. The motor housing 12 is fixed to a top plate 18A with a first plurality of fasteners 34 creating a forward bulkhead 16A. The motor housing 12 is fixed to a bottom plate 18B with a second plurality of fasteners 34 creating a rear bulkhead 16B. A central bulkhead 16C is arranged between the forward bulkhead 16A and the rear bulkhead 16B.

A primary output shaft 14 extends through the motor housing 12 through forward bulkhead 16A, central bulkhead 16C, and rear bulkhead 16B. A collet 32 is joined to the bottom plate 18B and stabilizes the primary output shaft 14.

A forward mechanical coupler 28 is fixed to the forward bulkhead 16A and further stabilizes the primary output shaft 14 with a forward thrust bearing 26. A rear mechanical coupler 28 is fixed to the rear bulkhead 16B and further stabilizes the primary output shaft 14 with a rear thrust bearing 26. A central mechanical coupler 28 is fixed to the central bulkhead 16C and further stabilizes the primary output shaft 14 with a central thrust bearing 26.

An upper primary shaft gear 20A is operatively coupled to the primary output shaft 14 and an upper output gear 20B. The upper output gear 20B is operatively coupled to an upper output shaft 20C with an upper clutch 22. An upper electric motor 30 rests on the central bulkhead 16C and is supported with upper offset hardware 24.

A lower primary shaft gear 20A is operatively coupled to the primary output shaft 14 and a lower output gear 20B. The lower output gear 20B is operatively coupled to a lower output shaft 20C with a lower clutch 22. A lower electric motor 30 rests on the lower bulkhead 16B and is supported with lower offset hardware 24.

The sequential propulsion drive assembly 10 is centralized about a primary output shaft 14 transferring all internally driven shaft power outside the enclosure 12 and into a mechanism, mechanically attached to the output shaft. The primary output shaft 14 extends through a forward bulkhead 16A and a rear bulkhead 16B which form the internal superstructure by which nearly all external complements are fastened to. The primary output shaft 14 is fastened to the substructure using a mechanical coupler 28 equipped with an internal bearing 26 to facilitate a nonbinding concentric mate with the primary output shaft 14. Between the forward and rear housing bulkheads 16A, 16B, the sequential propulsion drive assembly 10 can include at least one internal bulkheads 16C offering a plurality of sequenced motor stages. The forward bulkhead 16A, aft bulkhead 16B, and internal bulkheads 16C are all mechanically secured using a plurality of fasteners 34 and standoff hardware 24 sets.

Each bulkhead has a series of electric motors assemblies 30, which can be comprised of identical size/power/output configurations or comprised of a variety of size/power/output configurations, mounted in plurality to bulkheads 16A, 16B, and 16C in an offset position relative to the primary output shaft 14 as a singular motor or concentrically about the primary output shaft 14 as a plurality. Each motor 30 is equipped with an output gear 20A that is mounted directly onto the motor 30, mounted onto a motor output shaft 20C, or mounted to the motor 30 or motor output shaft 20C using a clutch mechanism 22. Output gears 20B can vary in size and gearing between common and uncommon electric motors 30 and are positioned to mechanically mate them with primary shaft gears 20A which are attached to the primary output shaft 14 and used to capture shaft power from electric motors 30, through their corresponding output gears 20B and directly transfer it to rotational force on the primary output shaft 14. The primary shaft gears 14 are mechanically mated with the output shaft 14 or through an integral clutch mechanism 22. The entire sequential propulsion drive assembly 10 is then enclosed within a protective enclosure 12 which is mechanically fastened to the bulkheads 16A, 16B, and 16C and can include features such as ventilation provisions, and openings to accommodate provisions for passthrough wire runs, electromagnetic shielding, sealant, mounting, and bonding provisions.

The sequential propulsion drive assembly 10 has a multitude of configurations designed to meet the requirements of the application at hand. All configurations are customizable by changing the number of motors, size of motors, and/or gear ratios. However, all configurations fall under two categories, those configurations that include direct mechanical mates between the electric motors 30, output gears 20B, primary shaft gears 20C, and primary shaft 14, and those configurations present one or more mechanical clutching stages 22 between the electric motors 30, and the primary output shaft 14.

For configurations including direct mechanical mates between the electric motors 30, output gears 20B, primary shaft gears 20C, and primary shaft 14, all mechanical force is transferred between the electric motors 30 and the primary output shaft 14. As a result, electric motors not exerting rotational force will instead be mechanically driven by other motors in the series or by external shaft forces. In this case, electric motors 30 not exerting rotational force can remain unpowered, disabled, or act as direct drive generators used to recover and convert captured shaft power to electric power.

For configurations presenting one or more mechanical clutching stages between the electric motors 30 and primary output shaft 14, the primary output shaft 14 power is controlled by commanding power to all electric motors 30 indiscriminately or by selecting powering on/off specific combinations of electric motors 30 dynamically to achieve desired shaft power, torque, efficiency, or RPMs. During these dynamically powered control actions, only powered electric motors 30 are contributing rotational force on the primary output shaft 14, leaving all unpowered electric motors 30 resting at a low or zero RPM state. The mechanical clutching configuration also serves to mechanically decouple electric motors 30 that have suffered a partial or catastrophic failure.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A sequential propulsion drive assembly, configured to drive a mechanical system; the sequential propulsion drive assembly comprising:
    a primary output shaft, extending through the motor housing through a forward bulkhead, a central bulkhead, and a rear bulkhead;
    a collet, joined to a bottom plate and configured to stabilize the primary output shaft;
    an upper primary shaft gear, operatively coupled to the primary output shaft and an upper output gear;
    an upper electric motor, resting on the central bulkhead and further comprising an upper output shaft,
    an upper clutch, joined to the upper output gear with the upper clutch;
    a lower primary shaft gear, operatively coupled to the primary output shaft and a lower output gear;
    a lower electric motor, resting on the rear bulkhead and further comprising a lower output shaft,
    a lower clutch, joined to the lower output gear with the lower clutch;
    a microcontroller, electrically coupled to the upper clutch and the lower clutch and programmed with a loop of instructions to execute while the sequential propulsion drive assembly is operative:

receiving an upper motor engagement instruction from a user or a controller;

engaging the upper motor to drive the upper output gear with the upper clutch;

receiving a lower motor engagement instruction from the user or the controller;

engaging the lower motor to drive the lower output gear with the lower clutch; and iterating the loop of instructions;

wherein the upper motor and the lower motor turn the primary output shaft.

2. The sequential propulsion drive assembly of claim 1, further comprising a forward mechanical coupler, fixed to the forward bulkhead and wherein the forward mechanical coupler further stabilizes the primary output shaft with a forward thrust bearing.

3. The sequential propulsion drive assembly of claim 2, further comprising a rear mechanical coupler, fixed to the rear bulkhead and wherein the rear mechanical coupler further stabilizes the primary output shaft with a rear thrust bearing.

4. The sequential propulsion drive assembly of claim 3, further comprising a central mechanical coupler, fixed to the central bulkhead and wherein the central mechanical coupler further stabilizes the primary output shaft with a central thrust bearing.

\* \* \* \* \*